US009248827B2

(12) United States Patent
Kamatani et al.

(10) Patent No.: US 9,248,827 B2
(45) Date of Patent: Feb. 2, 2016

(54) HYBRID VEHICLE AND CONTROL METHOD THEREOF

(75) Inventors: Hideki Kamatani, Nagoya (JP); Takashi Amano, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 45 days.

(21) Appl. No.: 14/236,257

(22) PCT Filed: Aug. 3, 2011

(86) PCT No.: PCT/JP2011/067743
§ 371 (c)(1),
(2), (4) Date: Jan. 30, 2014

(87) PCT Pub. No.: WO2013/018208
PCT Pub. Date: Feb. 7, 2013

(65) Prior Publication Data
US 2014/0163803 A1   Jun. 12, 2014

(51) Int. Cl.
| | |
|---|---|
| *B60W 20/00* | (2006.01) |
| *B60K 6/445* | (2007.10) |
| *B60W 10/24* | (2006.01) |
| *B60W 10/06* | (2006.01) |
| *B60W 10/26* | (2006.01) |

(52) U.S. Cl.
CPC .............. *B60W 20/106* (2013.01); *B60K 6/445* (2013.01); *B60W 10/06* (2013.01); *B60W 10/24* (2013.01); *B60W 20/00* (2013.01); *B60W 10/26* (2013.01); *B60W 2710/244* (2013.01); *Y02T 10/6239* (2013.01); *Y10S 903/903* (2013.01)

(58) Field of Classification Search
CPC .... B60K 6/445; B60W 20/00; B60W 20/106; B60W 10/06
USPC ........................... 701/22; 180/65.29; 903/903
See application file for complete search history.

(56) References Cited

U.S. PATENT DOCUMENTS

| | | | | |
|---|---|---|---|---|
| 6,232,748 | B1 * | 5/2001 | Kinoshita | 320/132 |
| 2004/0232861 | A1 | 11/2004 | Wakashiro et al. | |
| 2010/0152938 | A1 * | 6/2010 | Aoki et al. | 701/22 |
| 2012/0203414 | A1 * | 8/2012 | Akutsu et al. | 701/22 |

FOREIGN PATENT DOCUMENTS

| | | |
|---|---|---|
| JP | 2001-069602 A | 3/2001 |
| JP | 2001-169408 A | 6/2001 |
| JP | 2002-051405 A | 2/2002 |

(Continued)

*Primary Examiner* — Nga X Nguyen
(74) *Attorney, Agent, or Firm* — Kenyon & Kenyon LLP

(57) ABSTRACT

A hybrid vehicle is mounted with a traction motor, a power storage device for storing electric power input to and output from the traction motor, an engine, and a power generation mechanism to generate charging electric power for the power storage device by an output from the engine. An ECU sets charging/discharging electric power of the power storage device to control SOC of the power storage device to be within a predetermined range centered about a SOC control target in a running mode with the engine operating. The output from the engine is set to ensure the charging/discharging electric power. The ECU sets the charging/discharging electric power such that the power storage device is discharged to an extent corresponding to a predetermined SOC higher than the lower limit SOC according to requirement power required for vehicle running, even when the SOC is lower than the SOC control target.

15 Claims, 10 Drawing Sheets

(56) References Cited

FOREIGN PATENT DOCUMENTS

| JP | 3827980 | A | | 9/2006 |
| JP | 2007-307995 | A | | 11/2007 |
| JP | 2007307995 | A | * | 11/2007 |
| JP | 2008-308122 | A | | 12/2008 |
| JP | 2009-126257 | A | | 6/2009 |
| JP | 2010-143310 | A | | 7/2010 |
| JP | 2010-155512 | A | | 7/2010 |
| JP | 2010-195362 | A | | 9/2010 |

* cited by examiner

HYBRID VEHICLE AND CONTROL METHOD THEREOF

CROSS-REFERENCE TO RELATED APPLICATIONS

This is a national phase application based on the PCT International Patent Application No. PCT/JP2011/067743 filed on Aug. 3, 2011, the entire contents of which are incorporated herein by reference.

TECHNICAL FIELD

The present invention relates to a hybrid vehicle and a control method of the hybrid vehicle. More particularly, the present invention relates to charging and discharging control of a power storage device at a hybrid vehicle capable of generating charging electric power of the power storage device from an output of the engine.

BACKGROUND ART

At a hybrid vehicle having an engine and an electric motor mounted as the source of vehicle driving power, charging and discharging of a power storage device is controlled such that the SOC (State of Charge) of the power storage device (typically, a battery) is maintained within a predetermined control range in a running mode with the engine operating.

Japanese Patent Laying-Open No. 2002-51405 (PTD 1) discloses modifying the setting range of the remaining amount (SOC) of a power storage device (battery) allowing charging/discharging thereof according to a vehicle state. Specifically, the control of modifying the SOC control range based on a signal applied from a 3D gyro sensor, and control of modifying the SOC control range in response to a user switch and/or an operation of the accelerator or brakes are disclosed.

Japanese Patent Publication No. 3827980 (PTD 2) discloses, at a hybrid vehicle incorporating an electric motor generating assist torque, setting the assist amount according to a control manner differing for each regional zone provided for the remaining amount (SOC) in a power storage device. Particularly, providing a predetermined transitional usage region between a charging/discharging allowed region and a discharging suppressed region, and control of rendering the assist amount variable by the electric motor according to the SOC in the relevant transitional usage region are disclosed.

Japanese Patent Laying-Open No. 2001-69602 (PTD 3) discloses battery charging and discharging control at a hybrid vehicle that includes an engine, a motor generating driving power to assist the output of the engine, and a battery to which is charged electrical energy obtained by operating the motor as a power generator when the assisting driving power by the motor is not required. Specifically, control of allowing only discharging, when the temperature of the battery is higher than a predetermined temperature, until the SOC of the battery attains a predetermined value is disclosed. Accordingly, charging at a temperature region where the charging efficiency is degraded is prohibited to prevent battery degradation.

Japanese Patent Laying-Open No. 2001-169408 (PTD 4) discloses control to carry out regenerative charging and discharging efficiently for a hybrid vehicle is disclosed. Particularly, based on the battery SOC and road information including the current value information of the vehicle and high level information during the running route, the upper limit of allowing battery discharging is set such that the battery SOC attains the minimum value at the highest peak point on the running route.

CITATION LIST

Patent Document

PTD 1: Japanese Patent Laying-Open No. 2002-51405
PTD 2: Japanese Patent Publication No. 3827980
PTD 3: Japanese Patent Laying-Open No. 2001-69602
PTD 4: Japanese Patent Laying-Open No. 2001-169408

SUMMARY OF INVENTION

Technical Problem

At a hybrid vehicle controlling the SOC of the power storage device to be within a predetermined control range in a running mode with the engine operating, the sum of the power for charging and discharging the power storage device and the power required for vehicle running will be output from the engine. To this end, the engine output is generally controlled such that discharging from the power storage device is facilitated in a SOC region higher than the target SOC while charging to the power storage device in a SOC region lower than the target SOC is facilitated, in order to control the SOC of the power storage device to be at the target SOC.

However, according to charging/discharging control taking into consideration only the SOC, there is a possibility of not being able to execute charging/discharging of the power storage device efficiently during the running of frequent acceleration and deceleration. For example, since discharging is not requested from the standpoint of SOC control in a high SOC region, frequent acceleration and deceleration may lead to the possibility of continuing a high SOC state by the regenerative electric power generated at the time of deceleration. Continuation of a high SOC state may increase the generated heat caused by the higher internal pressure at the power storage device, whereby the charging efficiency may be degraded. Moreover, a significant high SOC state will restrict or prohibit charging of the power storage device. When collection of regenerative energy becomes insufficient by such factors, the energy efficiency of the vehicle, i.e. fuel efficiency, will be degraded.

To this context, PTD 1 and PTD 4 disclose modifying the SOC control range based on the running state. However, there is particularly no mentioning of control to modify the setting of the charging/discharging electric power of the power storage device according to the running state. PTD 2 and PTD 3 also do not mention in detail about the setting of the actual charging/discharging electric power of the power storage device.

In view of the foregoing, an object of the present invention is to improve the energy efficiency of a hybrid vehicle that controls the SOC of a power storage device in a running mode with the engine operating, by appropriately setting the charging/discharging electric power of the power storage device based on both the SOC of the power storage device and the running state of the vehicle.

Solution to Problem

According to an aspect of the present invention, a hybrid vehicle includes a power storage device, an engine, a power generation mechanism for generating charging electric power of the power storage device by an output from the engine, and a control unit. The control sets charging/discharging electric power of the power storage device to control the SOC of the power storage device to be within a range from a lower limit SOC to an upper limit SOC including a SOC control target in a running mode with the engine operating. The control unit sets the charging/discharging electric power, even when the SOC is lower than the SOC control target, such that the power storage device is discharged to an extent corresponding to a first SOC higher than the lower limit SOC according to requirement power required for vehicle running.

Preferably, the control unit sets the charging/discharging electric power such that the discharging electric power, when at a high speed state, becomes greater than at a low speed state, when the power storage device is to be discharged since the SOC is lower than the SOC control target and the requirement power is great.

Further preferably, the first SOC at a high speed state is set lower than the first SOC at a low speed state.

Also preferably, the control unit sets the charging/discharging electric power, even when the SOC is higher than the SOC control target, such that the power storage device is charged to an extent corresponding to a second SOC lower than the upper limit SOC, according to requirement power.

Further preferably, the control unit sets the charging/discharging electric power such that the charging electric power is lower at a high speed state than at a low speed state when the power storage device is to be charged since the SOC is higher than the SOC control target and the requirement power is small.

Further preferably, the second SOC at a high speed state is set lower than the second SOC at a low speed state.

Preferably, the control unit increases the setting range of charging/discharging electric power when the power storage device is at a low temperature state as compared to when the power storage device is at a high temperature state.

Alternatively and preferably, the control unit controls charging and discharging of the power storage device to facilitate discharging of the power storage device when the carrying load on the hybrid vehicle is heavy as compared to when the carrying load is light.

Another aspect of the present invention is directed to a control method of a hybrid vehicle incorporating a power storage device, an engine, and a power generation mechanism to generate charging electric power for the power storage device by an output from the engine. The control method includes the step of setting charging/discharging electric power of the power storage device to control the SOC of the power storage device to be within a range from a lower limit SOC to an upper limit SOC including a SOC control target in a running mode with the engine operating. The setting step includes the step of discharging the power storage device, even when the SOC is lower than the SOC control target, to an extent corresponding to a first SOC higher than the lower limit SOC according to requirement power required for vehicle running.

Preferably, the discharging step sets the charging/discharging electric power such that discharging electric power is greater at a high speed state than at a low speed state, when the power storage device is to be discharged since the SOC is lower than the SOC control target and the requirement power is great.

Further preferably, the first SOC at a high speed state is set lower than the first SOC at a low speed state.

Also preferably, the setting step further includes the step of charging the power storage device, even when the SOC is higher than the SOC control target, to an extent corresponding to a second SOC lower than the upper limit SOC according to requirement power.

Further preferably, the charging step sets the charging/discharging electric power such that the charging electric power is lower at a high speed state than at a low speed state, when the power storage device is to be charged since the SOC is higher than the SOC control target and the requirement power is small.

Preferably, the setting step further includes the step of increasing a setting range of the charging/discharging electric power when the power storage device is at a low temperature state as compared to when the power storage device is at a high temperature state.

Also preferably, the control method further includes the step of controlling charging and discharging of the power storage device to facilitate discharging of the power storage device when the carrying load of the hybrid vehicle is heavy as compared to when the carrying load is light.

Advantageous Effects of Invention

According to the present invention, the energy efficiency of a hybrid vehicle that controls the SOC of a power storage device in a running mode with the engine operating can be improved, by appropriately setting the charging/discharging electric power of the power storage device based on both the SOC of the power storage device and the running state of the vehicle.

DESCRIPTION OF EMBODIMENTS

Figure 1:
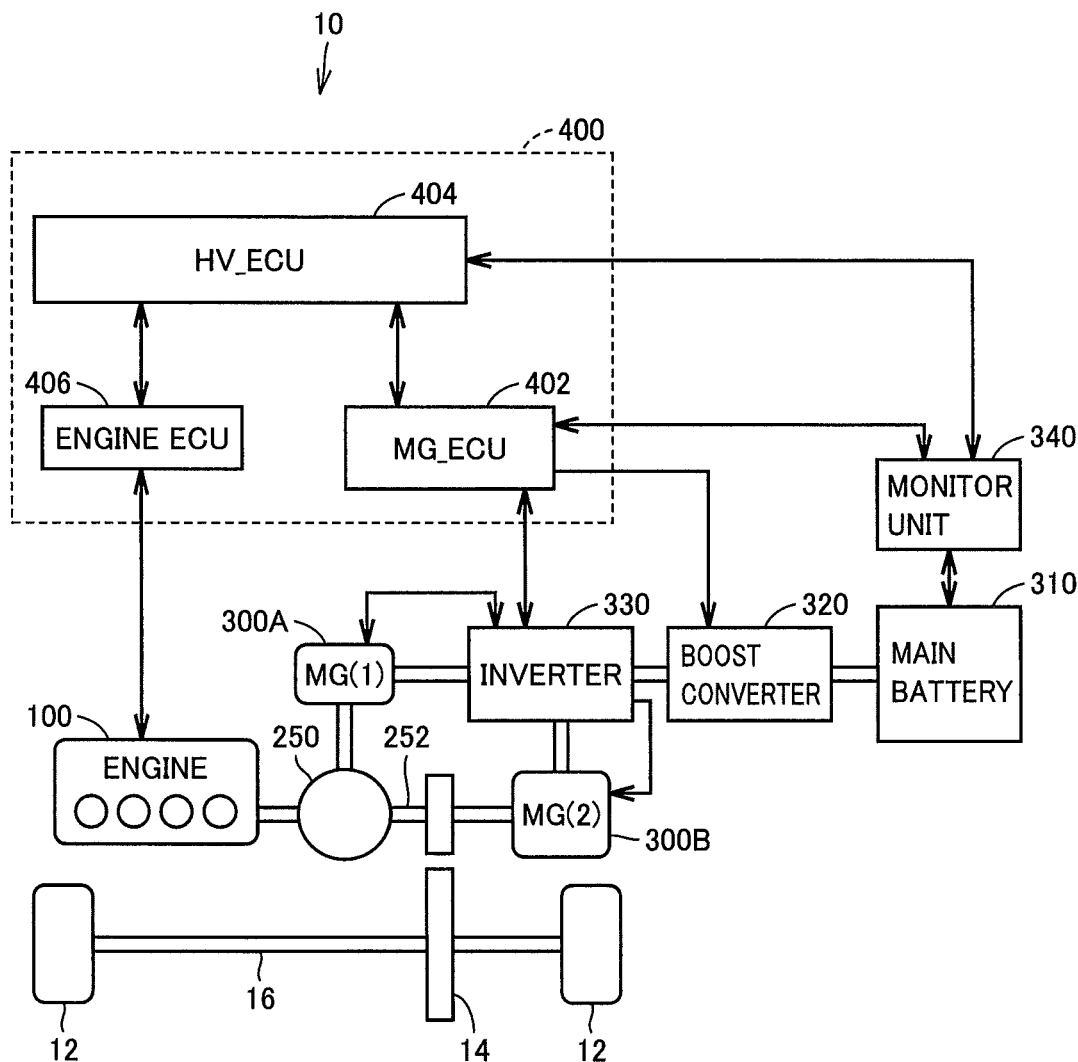
FIG. 1 is a block diagram to describe an exemplified configuration of a hybrid vehicle according to an embodiment of the present invention.

Embodiments of the present invention will be described in detail hereinafter with reference to the drawings. In the drawings, the same or corresponding elements have the same reference characters allotted, and description thereof basically will not be repeated.

First Embodiment

FIG. 1 is a block diagram to describe an exemplified configuration of a hybrid vehicle 10 according to an embodiment of the present invention mounted.

Referring to FIG. 1, hybrid vehicle 10 includes a driving wheel 12, a reduction gear 14, a drive shaft 16, an engine 100, a power split mechanism 250, motor generators 300A (MG (1)) and 300B (MG (2)), and a main battery 310 storing the driving electric power of motor generators 300A and 300B.

Each of motor generators 300A and 300B is typically constituted of a permanent magnet type 3-phase AC synchronous motor, operable as an electric motor and a power generator by torque control.

Power split mechanism 250 is coupled with an output shaft of engine 100, an output shaft of motor generator 300A, and an output shaft 252. Output shaft 252 is coupled with the output shaft of motor generator 300B. Further, reduction gear 14 is provided between drive shaft 16 that drives driving wheel 12 and output shaft 252. Accordingly, through a predetermined speed reducing ratio, the rotational force of output shaft 252 by engine 100 and motor generators 300A, 300B can be transmitted to driving wheel 12, and inversely, the rotational force of driving wheel 12 can be transmitted to motor generator 300B via output shaft 252.

The output from engine 100 is divided by power split mechanism 250 to output shaft 252 and motor generator 300A. Motor generator 300A can operate as a power generator using the power from engine 100 by being controlled so as to output torque in a direction opposite to the rotating direction. The electric power generated by motor generator 300A can be used to charge main battery 310 and/or to drive motor generator 300B. In other words, motor generator 300A corresponds to "power generation mechanism".

Motor generator 300A can function as a starter of engine 100 by operating as an electric motor at the startup of engine 100.

Further, motor generator 300B can operate as a power generator at the time of regenerative braking to generate the charging electric power for main battery 310. At this stage, the kinetic energy of the vehicle is converted into electrical energy, causing generation of regenerative braking power, whereby hybrid vehicle 10 is reduced in speed.

Furthermore, since the output shafts of engine 100, motor generator 300A and motor generator 300B are coupled via power split mechanism 250, the ratio of the revolution speed of engine 100 to the revolution speed of output shaft 252 (transmission gear ratio) can be controlled in a stepless manner by the revolution speed control of motor generator 300A during running.

Hybrid vehicle 10 runs with the power of at least one of engine 100 and motor generator 300B. In other words, motor generator 300B corresponds to a traction motor for generating the vehicle driving power. Hybrid vehicle 10 can have engine 100 stopped, running with only the output of motor generator 300B that operates as a motor. Generally when running at a low speed state or low load state, a running mode with engine 100 inactive (hereinafter, also referred to as "EV mode") is selected.

When the power required for hybrid vehicle 10 to run becomes higher, a running mode with engine 100 operating (hereinafter, also referred to as "HV mode") is selected. In the HV mode, the output from engine 100 can be used as the power for vehicle running, and also as the power for generating the charging electric power for main battery 310. In the HV mode, the vehicle may run with the output from engine 100 alone, or run with the summed outputs from engine 100 and from motor generator 300A.

When the SOC of main battery 310 is reduced, engine 100 is started to force the charging of main battery 310 even in a state where running with the output of motor generator 300B alone is allowed. In this case, the HV mode is selected.

Thus, an EV mode with engine 100 stopped and an HV mode with engine 100 operating is selectively applied according to the vehicle state at hybrid vehicle 10. When transition from the EV mode to the HV mode is specified, engine 100 is started in association with motoring by motor generator 300A. When transition from the HV mode to the EV mode is specified, engine 100 is stopped. At this stage, motor generator 300A may output speed reducing torque to stop engine 100 promptly.

Hybrid vehicle 10 further includes a monitor unit 340 of main battery 310, a boost converter 320, an inverter 330, a MG (Motor Generator) ECU (Electronic Control Unit) 402, an HV (Hybrid Vehicle) ECU 404, and an engine ECU 406.

Main battery 310 is indicated as a typical example of "power storage device", typically constituted of a secondary battery such as of nickel-metal hydride or lithium ion. Alternatively, an electrical double layer capacitor may be employed as "power storage device" instead of a secondary battery. Monitor unit 340 monitors a state of main battery 310 (across-terminal voltage (battery voltage) Vb, battery current Ib, battery temperature Tb, and the like).

Inverter 330 executes bidirectional power conversion between AC power that is input to and output from motor generators 300A, 300B, and DC power that is input to and output from main battery 310. Inverter 330 is represented as one block globally representing a plurality of inverters provided individually corresponding to each of motor generators 300A and 300B.

Boost converter 320 executes bidirectional DC voltage conversion between the DC link voltage of inverter 330 (corresponding to the AC voltage amplitude of motor generators 300A, 300B) and the output voltage from main battery 310. As a result, motor driving control can be rendered highly efficient since the rated voltage of motor generators 300A, 300B can be set higher than the rated voltage of main battery 310.

MG_ECU 402 controls motor generators 300A, 300B, inverter 330, and the charging/discharging state of main battery 310 according to the state of hybrid vehicle 10. Engine ECU 406 controls the operating state of engine 100. HV_ECU 404 monitors and controls engine ECU 406 and MG_ECU 402 relatively so as to control the overall hybrid system such that hybrid vehicle 10 can be operated most efficiently.

Each ECU is formed of an electronic control unit incorporating a CPU (Central Processing Unit) and memory not shown, and is configured to perform computing using detection values from each sensor based on a map and program stored in a relevant memory. Alternatively, at least a portion of ECU may be configured to execute a predetermined arithmetic/logical operation by hardware such as an electronic circuit.

Although FIG. 1 shows each ECU implemented as a separate configuration, two or more ECUs may be integrated as an ECU. For example, an exemplified configuration is to integrate MG_ECU 402, HV_ECU 404 and engine ECU 406 as an ECU 400, as indicated by the dotted line in FIG. 1. In the following description, they are generically indicated as ECU 400 without discrimination between MG_ECU 402, HV_ECU 404 and engine ECU 406.

To ECU 400 are input values of the state of main battery 310 (across-terminal voltage Vb, battery current Ib, battery temperature Tb, and the like), or a signal notifying occurrence of an error, from a vehicle speed sensor, an accelerator position sensor, a throttle opening position sensor, a revolution speed sensor and current sensor of motor generators 300A, 300B, an engine revolution sensor (all not shown), and from monitor unit 340.

ECU 400 calculates SOC indicating the remaining amount in main battery 310 based on at least some of battery temperature Tb, battery current Ib and battery voltage Vb of main battery 310. SOC is the current remaining amount with respect to a fully charged state in percentage.

Main battery 310 can be configured to allow charging from a power supply external to the vehicle. In this case, a charger (not shown) to control the charging of main battery 310 by electric power from an external power supply must be provided. The feeding from an external power supply is allowed applying contact charging using a charging cable, or non-contact charging via a coil.

Figure 2:
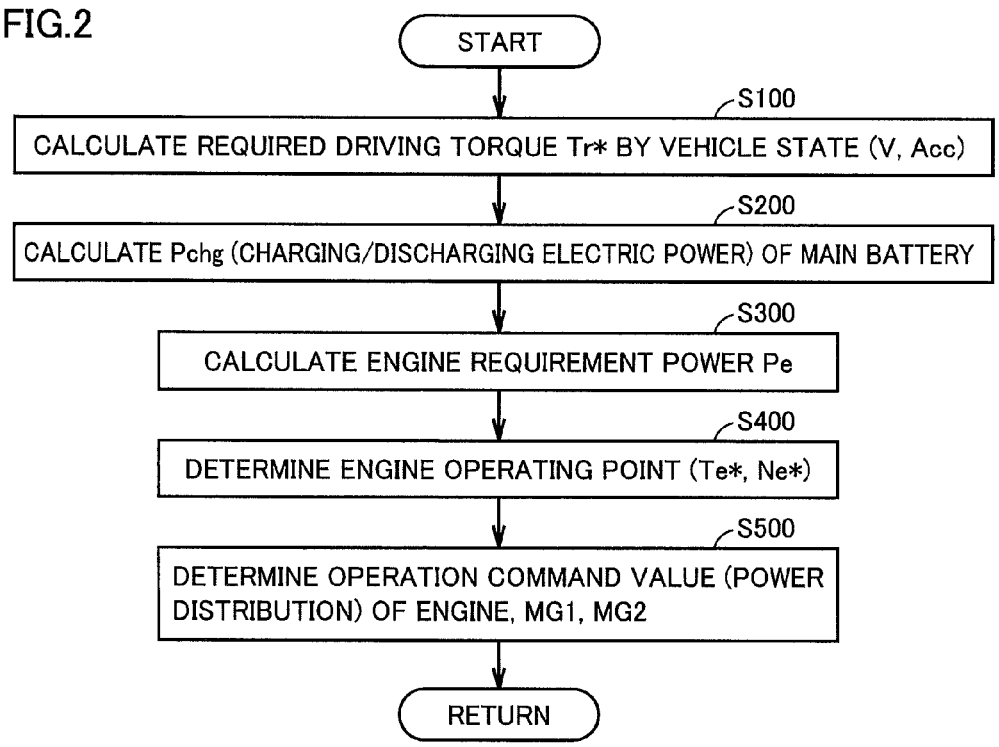
FIG. 2 is a flowchart to describe a control process for running control of a hybrid vehicle according to a first embodiment of the present invention.

FIG. 2 is a flowchart to describe a control process for running control of a hybrid vehicle according to the first embodiment of the present invention. It is assumed that the process at each step in each flowchart such as FIG. 2 is implemented by software processing and/or hardware processing by ECU 400.

By step S100, ECU 400 calculates required driving torque Tr* from the vehicle state. For example, a map (not shown) having the relationship of accelerator pedal position (Acc) and vehicle speed (V) with required driving torque Tr* determined in advance is prestored in ECU 400. ECU 400 can calculate required driving torque Tr* by referring to the relevant map based on the current accelerator pedal position and vehicle speed.

Then, ECU 400 obtains charging/discharging electric power Pchg of main battery 310 by step S200. Charging/discharging electric power Pchg is set at a positive value (Pchg>0) and a negative value (Pchg<0) when charging is required and discharging is required, respectively. The way to set charging/discharging electric power Pchg will be described in detail afterwards. By determining charging/discharging electric power Pchg, the charging/discharging electric power of the power storage device (main battery 310) is set.

Furthermore, by step S300, ECU 400 calculates requirement power Pe for engine 100 (hereinafter, also referred to as engine requirement power Pe). Engine requirement power Pe is calculated according to equation (1) set forth below, for example. In equation (1), Nr represents the revolution speed of output shaft 252, and Loss represents the loss term.

$$Pe=Tr^* \cdot Nr+Pchg+\text{Loss} \tag{1}$$

At step S400, ECU 400 determines the operating point of engine 100 according to engine requirement power Pe calculated by step S300.

Figure 3:
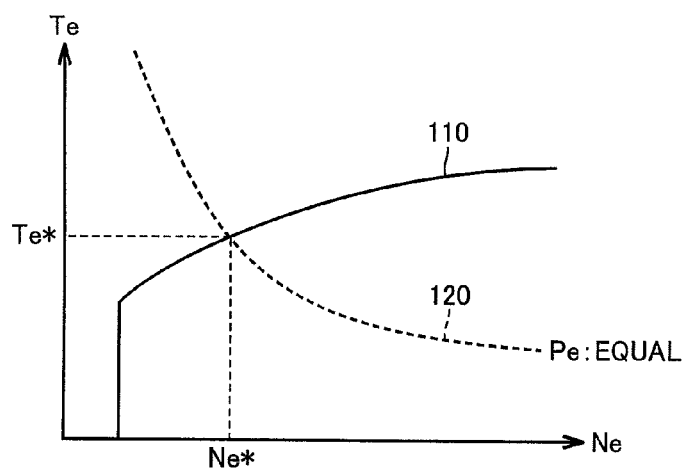
FIG. 3 is a schematic diagram to describe setting of an engine operating point.

FIG. 3 is a schematic diagram to describe the setting of an engine operating point.

Referring to FIG. 3, the engine operating point is defined by a combination of engine revolution speed Ne and engine torque Te. The product of engine revolution speed Ne and engine torque Te corresponds to the engine output power.

An operation line 110 is determined in advance as a group of engine operating points at which engine 100 can operate at high efficiency. Operation line 110 corresponds to the optimum fuel efficiency line to suppress fuel consumption at the same power output.

ECU 400 takes the crossing point between an operation line 110 determined in advance and an equal power line 120 corresponding to engine requirement power Pe calculated at step S300 as the engine operating point (target revolution speed Ne* and target torque Te*).

Referring to FIG. 2 again, ECU 400 generates the operation command values of engine 100 and motor generators 300A, 300B by step S500.

At this stage, the output torque of motor generator 300A is determined such that the engine revolution speed is regulated at target revolution speed Ne* by the output torque of motor generator 300A mechanically coupled with engine 100 by power split mechanism 250.

Further, ECU 400 calculates driving torque (direct torque) Tep mechanically transmitted to output shaft 252 when engine 100 is operated according to the engine operating point determined as set forth above. For example, direct torque Tep is set taking into account the gear ratio of power split mechanism 250.

Then, ECU 400 calculates the output torque of motor generator 300B so as to compensate for the excessive/insufficient amount (Tr*−Tep) of direct torque Tep relative to required driving torque Tr*. In other words, the following equation (2) is established where the output torque of motor generator 300B is Tm2. Tm2* is the torque acting on output shaft 252 by the output from motor generator 300B.

$$Tr^*=Tep+Tm2^* \tag{2}$$

At step S500, the operation command values of engine 100 and motor generators 300A, 300B are set based on the operating point of engine 100 and the output torque of motor generators 300A and 300B, determined as set forth above.

Engine 100 and motor generators 300A, 300B are controlled according to these operation command values.

By such running control, the power distribution relative to the total requirement power between engine 100 and motor generators 300A, 300B can be determined such that required driving torque Tr* acts on the driving shaft while engine 100 is operated on the operation line of high efficiency in a running mode with engine operating (HV mode). Further, the charging/discharging of main battery 310 according to charging/discharging electric power Pchg allows the SOC to be regulated.

The setting of charging/discharging electric power Pchg will be described in detail hereinafter.

Figure 4:
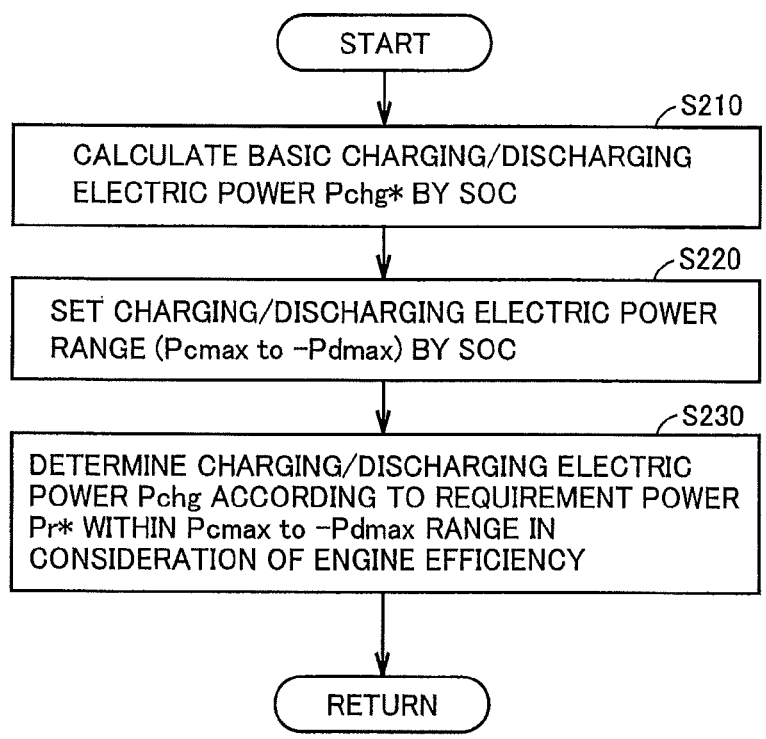
FIG. 4 is a flowchart to describe in detail a control process to set charging/discharging electric power at the hybrid vehicle according to the first embodiment of the present invention.

FIG. 4 is a flowchart to describe in detail a control process (S200) to set charging/discharging electric power Pchg.

Referring to FIG. 4, ECU 400 calculates the basic charging/discharging electric power Pchg* based on the current SOC of main battery 310 by step S210. The SOC is sequentially calculated based on at least some of battery temperature Tb, battery current Ib and battery voltage Vb of main battery 310, as mentioned above.

Then, by step S220, ECU 400 sets, based on the current SOC, a charging upper limit value Pcmax and a discharging upper limit value Pdmax indicating the range of charging/discharging electric power Pchg.

Discharging upper limit value Pdmax takes a positive value (Pdmax>0) and a negative value (Pdmax<0) when in a discharging state and charging state, respectively, opposite to that of charging/discharging electric power Pchg. In contrast, charging upper limit value Pcmax takes a negative value (Pcmax<0) and a positive value (Pcmax>0) when in a discharging state and charging state, respectively, likewise with charging/discharging electric power Pchg. In other words, charging/discharging electric power Pchg is set within the range of Pcmax≥Pchg≥−Pdmax.

The setting range of charging/discharging electric power will be described in detail with reference to the schematic diagram of FIG. 5.

Figure 5:
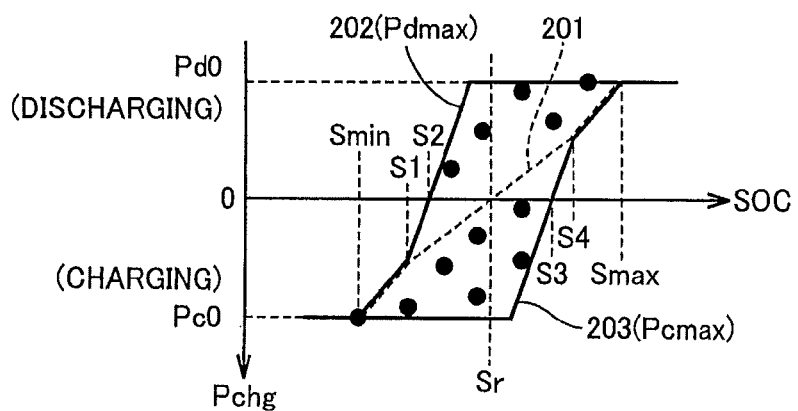
FIG. 5 is a schematic diagram to describe a setting range of charging/discharging electric power at the hybrid vehicle according to the first embodiment.

Referring to FIG. 5, basic charging/discharging electric power Pchg* is set by referring to a map according to a characteristic line 201 (hereinafter, also referred to as basic map 201). By basic map 201 with respect to SOC control target Sr, basic charging/discharging electric power is set at Pchg*=0 when SOC=Sr and at Pchg*<0 so as to discharge main battery 310 when SOC>Sr. When SOC≥Sr, Pchg*<0 is set so as to charge main battery 310. Although control target Sr is set as a single SOC in the example of FIG. 8, a predetermined SOC range may be set as the control target.

When the SOC becomes lower than the lower limit of the SOC control range (lower limit SOC) Smin, Pchg* is set at the maximum charging value Pc0 (Pc0>0). Similarly, in the case where the SOC becomes higher than upper limit SOC (Smax), Pchg* is set at the maximum discharging value Pd0 (Pd0<0).

Discharging upper limit value Pdmax is set by referring to a map according to a characteristic line 202 (hereinafter, also referred to as discharging upper limit map 202). Discharging upper limit map 202 is set to obtain charging upper limit value Pcmax according to SOC.

In the range of SOC<S1, discharging upper limit value Pdmax is set (Pdmax=−Pchg*) according to Pchg* (Pchg*>0) such that charging according to at least Pchg* is executed. In the range of S1<SOC<S2, Pdmax is set (Pdmax<0) so as to allow charging with an electric power lower than Pchg*.

When SOC=S2, Pdmax=0 is set. When in the range of S2<SOC<Sr, Pchg*>0 (charging) is set while Pdmax>0 is set to permit discharging of main battery 310. In order to allow discharging at an electric power greater than Pchg* even in the range of SOC≤Sr, for example, in order to allow discharging to an extent corresponding to the maximum discharging value Pd0, Pdmax is set (Pdmax>0).

Similarly, charging upper limit value Pcmax is set by referring to a map according to a characteristic line 203 (hereinafter, also referred to as charging upper limit map 203). Charging upper limit map 203 is set to obtain charging upper limit value Pcmax according to the SOC.

In the range of SOC>S4, charging upper limit value Pcmax is set (Pcmax<0) according to Pchg* (Pchg*<0) such that discharging is executed according to at least Pchg*. In the region of S3<SOC<S4, Pdmax is set (Pcmax<0) so as to allow discharging at an electric power lower than Pchg*.

When SOC=S3, Pcmax=0 is set. In the range of Sr<SOC<S3, Pchg*<0 (discharging) is set while Pcmax>0 is set to allow charging of main battery 310. In order to allow charging at an electric power greater than Pchg*, for example, to allow charging to an extent corresponding to maximum charging value Pc0, even in the region of SOC≥Sr, Pcmax is set (Pcmax>0).

Thus, the setting range (Pcmax≥Pchg≥−Pdmax) of charging/discharging electric power Pchg is determined according to discharging upper limit map 202 and charging upper limit map 203, shown in FIG. 5.

Referring to FIG. 4 again, ECU 400 determines, by step S230, charging/discharging electric power Pchg taking into account the engine efficiency within the range of the charging/discharging electric power set at step S220.

Figure 6:
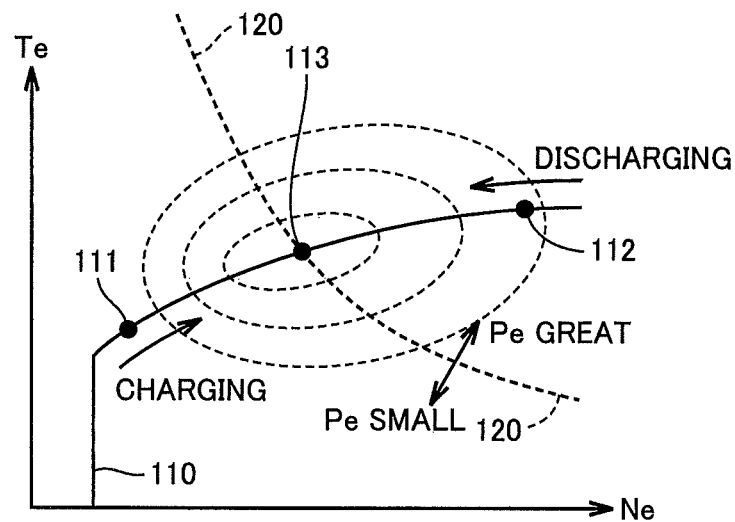
FIG. 6 is a schematic diagram to describe the relationship between charging/discharging electric power setting and engine heat efficiency.

FIG. 6 schematically represents the relationship between the charging/discharging electric power setting and engine heat efficiency.

Referring to FIG. 6, operation line 110 corresponds to a group of operating points of highest efficiency at each engine requirement power Pe, described in accordance with FIG. 3. It is to be noted that the heat efficiency of engine 100 differs according to the operating point. An equal heat efficiency line connecting together operating points with equal heat efficiency is indicated by a dotted line in FIG. 6.

It is therefore appreciated that there is an operating point 113 where the heat efficiency is highest on operation line 110. Thus, the efficiency of engine 100 will be improved by increasing engine requirement power Pe by increasing the charging requirement, if possible, for operating point 111. Similarly, for operating point 112, the efficiency of engine 100 will be improved by reducing engine requirement power Pe by increasing the discharging requirement, if possible.

Figure 7:
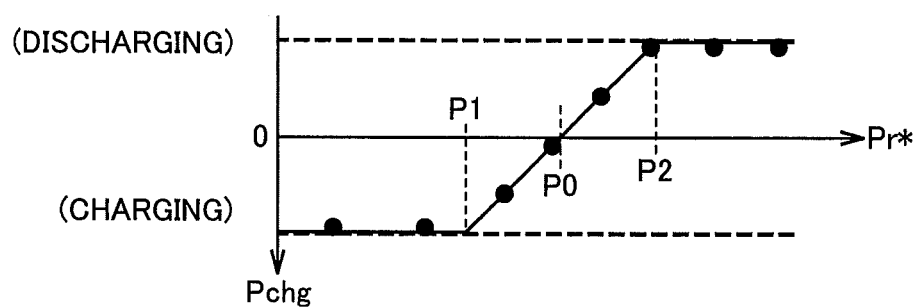
FIG. 7 is a schematic diagram to describe charging/discharging electric power setting according to requirement power at the hybrid vehicle of the first embodiment.

To this end, charging/discharging electric power Pchg is set based on the requirement power according to the characteristic line (map) shown in FIG. 7.

Referring to FIG. 7, requirement power Pr* represented along the horizontal axis in FIG. 7 indicates the power required for vehicle running (for example, Pr*=Tr*·Nr+Loss) based on required driving torque Tr* obtained by step S100 (FIG. 2). Power P0 in FIG. 7 is engine requirement power Pe* corresponding to operating point 113 in FIG. 7.

By the operation of engine 100 providing Pr* output when Pr*=P0 implies that engine 100 operates at operating point 113. At this stage, by setting Pchg=0, requirement power Pr* based on required driving torque Tr* can be output with the efficiency of engine 100 maximized. Therefore, at step S230, charging/discharging electric power Pchg is set at PChg=0 when Pr*=P0.

When Pr*>P0, engine requirement power Pe is preferably reduced so as to approximate operating point 113 from operating point 112 in FIG. 7. Therefore, charging/discharging electric power Pchg is set in the discharging direction. In other words, in the range of Pcmax>Pchg>−Pdmax, charging/discharging electric power Pchg of optimum efficiency is set. Charging/discharging electric power Pchg is set to come closer to −Pdmax as a function of greater difference between Pr* and P0. In the range of Pr*>P2, Pchg=−Pdmax is set according to discharging upper limit value Pdmax.

In contrast, when Pr*<P0, engine requirement power Pe is preferably increased so as to approximate operating point 113 from operating point 111 in FIG. 7. Therefore, charging/discharging electric power Pchg is set in the charging direction. In other words, in the range of −Pdmax<Pchg<Pcmax, charging/discharging electric power Pchg of optimum efficiency is set. Charging/discharging electric power Pchg is set to come closer to Pcmax as a function of a greater difference between Pr* and P0. In the range of Pr*<P1, Pchg=Pcmax is set according to charging upper limit value Pcmax.

Thus, by step S230, charging/discharging electric power Pchg is set according to requirement power Pr* to improve the efficiency of engine 100, leading to improving the efficiency of the entire system, in the range of Pcmax to −Pdmax shown in FIG. 5.

Accordingly, at the hybrid vehicle of the first embodiment, basic charging/discharging electric power Pchg* is set to maintain the SOC within a predetermined control range centered about control target Sr, and charging/discharging electric power Pchg can be set at the charging side or discharging side than basic charging/discharging electric power Pchg* so as to increase the efficiency of engine 100 to improve fuel efficiency.

By setting discharging upper limit map 202 to allow discharging of main battery 310, charging/discharging electric power Pchg can be set such that main battery 310 is discharged when at a high load running state where requirement power Pr* becomes great. Further, by setting charging upper limit map 203 to allow charging of main battery 310, charging/discharging electric power Pchg can be set such that main battery 310 is charged when at a low load running state where requirement power Pr* is small.

Since the vehicle is accelerated in a high load running state, charging electric power is generated by regenerative energy after acceleration ends. Therefore, by presetting SOC low during high load running, further charging of main battery 310 by the regenerative power in a state where the SOC is high can be prevented. Thus, continuation of a high SOC state of main battery 310 can be prevented.

As a result, the vehicle energy efficiency can be improved by suppressing reduction in the charging efficiency and collect the regenerative energy effectively. Particularly, by providing discharging upper limit map 202 so as to allow discharging of main battery 310 even in the region of SOC<Sr, as shown in FIG. 5, the aforementioned advantage can be further increased.

Figure 8:
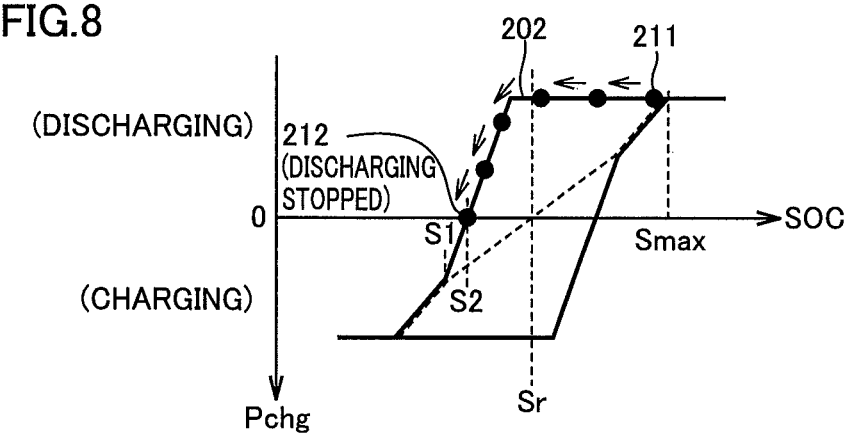
FIG. 8 is a schematic diagram to describe SOC transition in a high load running state from a high SOC state at the hybrid vehicle according to the first embodiment of the present invention.

FIG. 8 represents an example of SOC transition in a high load running state from a high SOC state at the hybrid vehicle according to the first embodiment of the present invention.

Referring to FIG. 8, charging/discharging electric power Pchg is set according to discharging upper limit value Pdmax since requirement power Pr* is great at a high load running state. Therefore, when high load running is initiated in the vicinity of upper limit SOC (Smax) (state 211), charging/discharging electric power Pchg is set such that main battery 310 is discharged in accordance with discharging upper limit map 202 (FIG. 5). Accordingly, the SOC is gradually decreased.

When the SOC arrives at S2 (first SOC) (state 212), the setting of Pdmax=0 causes the discharging of main battery 310 to stop. Therefore, even if a high load running state is continued, the SOC will not become lower than S2 since charging/discharging electric power Pchg is set at the charging side (Pchg>0). In other words, discharging upper limit map 202 is configured to allow discharging of main battery 310 with SOC=S2 as the limit. Since the SOC rises again by the regenerative charging at the time of deceleration following acceleration, the return of the SOC to control target Sr can be expected. In other words, even if the SOC is decreased down to a region lower than the control target during high load running, the event of overdischarging of main battery 310 can be avoided since charging by regenerative energy can be expected.

Figure 9:
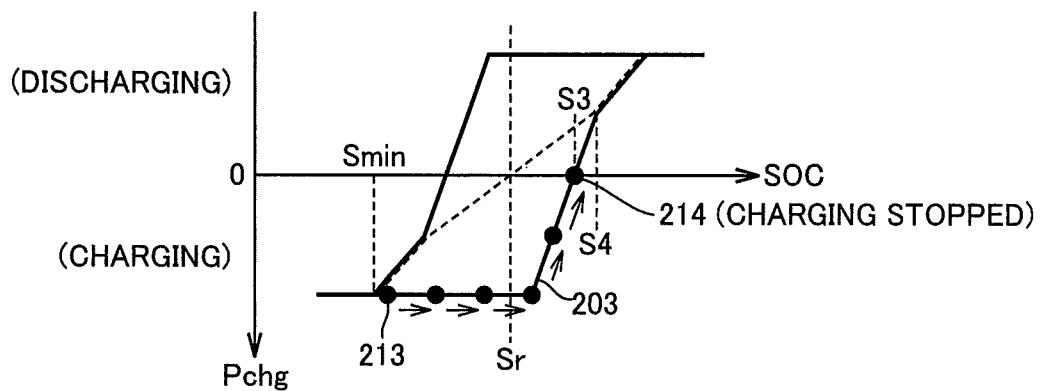
FIG. 9 is a schematic diagram to describe an example of SOC transition in a high load running state from a low SOC state at the hybrid vehicle according to the first embodiment of the present invention.

FIG. 9 represents an example of SOC transition in a high load running state from a low SOC state at the hybrid vehicle according to the first embodiment of the present invention.

Referring to FIG. 9, charging/discharging electric power Pchg is set according to charging upper limit value Pcmax since requirement power Pr* is low when in a low load running state. Therefore, when low load running is initiated in the vicinity of lower limit SOC (Smin) (state 213), charging/discharging electric power Pchg is set such that main battery 310 is charged in accordance with charging upper limit map 203 (FIG. 5). Accordingly, the SOC is gradually increased.

When the SOC reaches S3 (second SOC) (state 214), the charging of main battery 310 is stopped since Pcmax=0 is set.

Therefore, even if a low load running state continues, the SOC will not become higher than S3 since charging/discharging electric power Pchg is set at the discharging side (Pchg<0). In other words, charging upper limit map 203 is configured to allow charging of battery 310 with SOC=S3 as the limit.

Thus, suppressing charging in a low load running state allows excessive increase of the SOC to be prevented even if the main battery is charged by the regenerative energy at the time of deceleration following acceleration. In other words, the operating point (output power) of engine 100 can be set so as to increase the heat efficiency of engine 100 with excessive increase of the SOC suppressed in a low load running state.

Thus, in a running mode with engine operating at the hybrid vehicle of the first embodiment, appropriate setting of charging/discharging electric power Pchg based on both the SOC of the power storage device and the vehicle running state (requirement power Pr*) allows the energy efficiency of the vehicle to be improved while maintaining the SOC to be within a control range.

Second Embodiment

Each of the embodiments that will be described hereinafter mainly differs from the first embodiment in the setting technique of charging/discharging electric power Pchg. In the following embodiments, only the elements differing from those of the first embodiment will be described, and description of elements common to those of the first embodiment will not be repeated.

Figure 10:
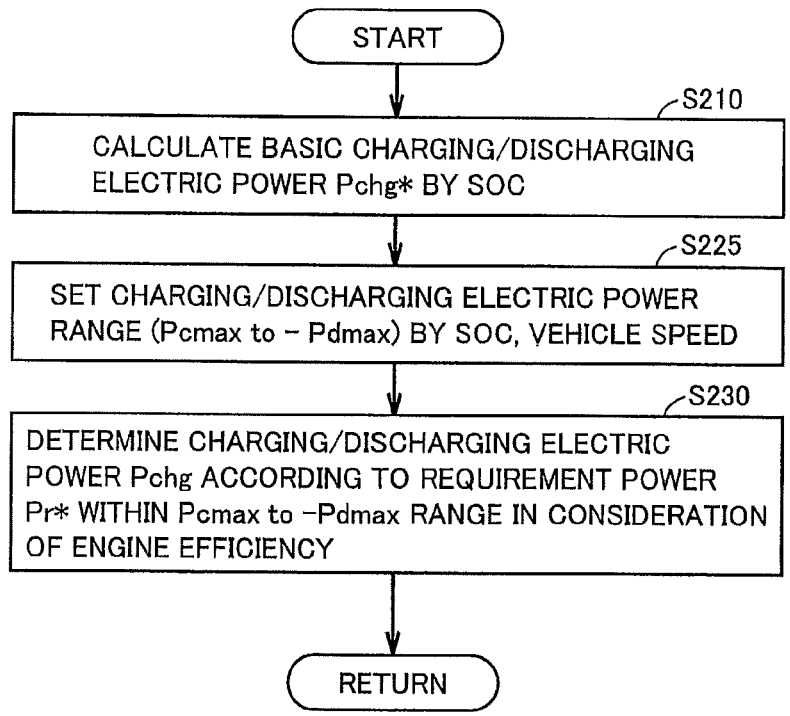
FIG. 10 is a flowchart to describe in detail a control process to set charging/discharging electric power at a hybrid vehicle according to a second embodiment of the present invention.

FIG. 10 represents a control process to set charging/discharging electric power Pchg at a hybrid vehicle according to a second embodiment, executed instead of the control process in FIG. 4.

Referring to FIG. 10, following the process of step S210 that is the same in FIG. 4, ECU 400 sets, based on the current SOC and vehicle speed, a charging upper limit value Pcmax and a discharging upper limit value Pdmax, indicating the range of charging/discharging electric power Pchg, by step S225. Further, ECU 400 determines charging/discharging electric power Pchg so as to improve the heat efficiency of engine 100 within the range of Pcmax to −Pdmax set at S225, by step S230 that is the same in FIG. 4. In the second embodiment, the setting of charging and discharging upper limit values Pcmax and Pdmax differs from that of the first embodiment.

The setting of charging and discharging upper limit values Pcmax and Pdmax at step S225 will be described based on the schematic diagram of FIG. 11.

Figure 11:
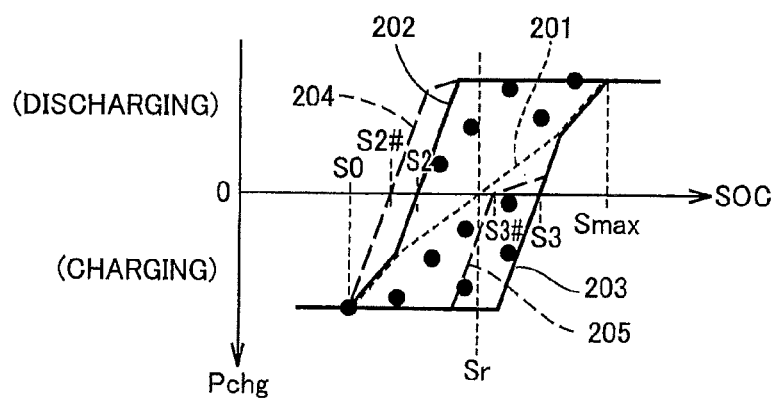
FIG. 11 is a schematic diagram to describe a setting range of charging/discharging electric power at the hybrid vehicle according to the second embodiment.

Comparing FIG. 11 with FIG. 5, basic charging/discharging electric power Pchg* is set according to basic map 201 that is the same in FIG. 5 in the second embodiment. It is to be noted that, in the second embodiment, the discharging upper limit map and charging upper limit map are switched according to the vehicle speed of hybrid vehicle 10, differing from the first embodiment.

Discharging upper limit map 202 and charging upper limit map 203 are similar to those shown in FIG. 5. When hybrid vehicle 10 is not at a high speed state, for example when the vehicle speed is less than or equal to a predetermined threshold value, charging and discharging upper limit values Pcmax and Pdmax are set according to discharging upper limit map 202 and charging upper limit map 203 along the entire SOC region.

When hybrid vehicle 10 is at a high speed state, for example, when the vehicle speed is higher than a predetermined threshold value, discharging upper limit value Pdmax is set according to a discharging upper limit map 204 instead of discharging upper limit map 202 in some area of the SOC region. Similarly, when hybrid vehicle 10 is at a high speed vehicle state, charging upper limit value Pcmax is set according to a charging upper limit map 205 instead of charging upper limit map 203 in some area of the SOC region.

It is appreciated that discharging upper limit map 204 is set to increase discharging upper limit value Pdmax relative to the same SOC, as compared to discharging upper limit map 202. Accordingly, in a high load running state when the vehicle speed is high, discharging to the extent of SOC=S2# (S2#<S2) is allowed.

Similarly, it is appreciated that charging upper limit map 205 is set to decrease charging upper limit value Pcmax relative to the same SOC, as compared to charging upper limit map 203. Accordingly, in a low load running state when the vehicle speed is high, charging is allowed only to the extent of SOC=S3# (53#<S3). In other words, charging is suppressed.

Thus, in the second embodiment, charging/discharging electric power Pchg is set such that discharging of main battery 310 is facilitated relative to the same SOC when at a high speed state.

Figure 12:
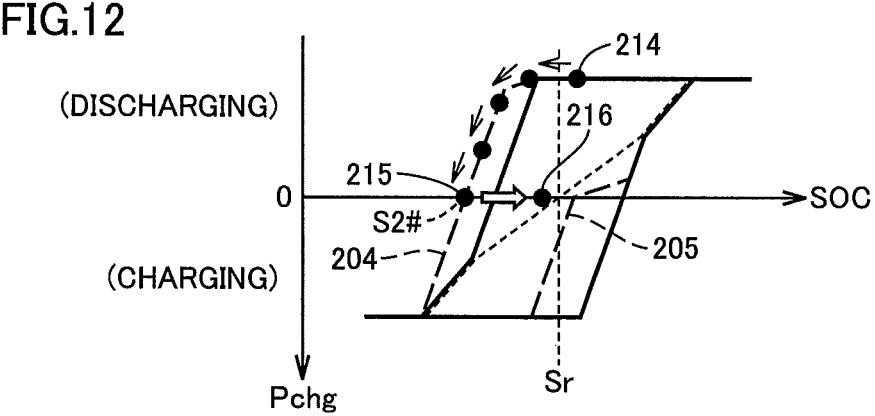
FIG. 12 is a schematic diagram to describe SOC transition in a high load running state from a high speed and high SOC state at the hybrid vehicle according to the second embodiment of the present invention.

FIG. 12 represents an example of SOC transition in a high load running state from a high speed and high SOC state at the hybrid vehicle according to the second embodiment of the present invention.

Referring to FIG. 12, charging/discharging electric power Pchg is set according to discharging upper limit value Pdmax since requirement power Pr* is great when in a high load running state. Therefore, when high load running is initiated in the vicinity of upper limit SOC (Smax) at a high speed state (state 214), charging/discharging electric power Pchg is set such that main battery 310 is discharged in accordance with discharging upper limit map 204 (FIG. 11). As a result, the SOC is gradually decreased.

When the SOC reaches S2# (first SOC) (state 215), the discharging of main battery 310 is stopped since Pdmax=0 is set. Therefore, even if a high load running state is further continued, the SOC will not become lower than S2# since charging/discharging electric power Pchg is set at the charging side (Pchg>0). In other words, discharging upper limit map 204 is configured to allow discharging of main battery 310 with SOC=S2# as the limit. Accordingly, when at a high speed state, discharging is facilitated down to a lower SOC, as compared to a non-high speed state.

Since the SOC rises again by regenerative power during deceleration following acceleration, the recovery of the SOC to state 216 can be expected (state 216). Since the energy collected by regenerative braking is great at a high speed state, the SOC of main battery 310 can be prevented from becoming too low even if the SOC is reduced down to the region lower than that of a non-high speed state.

Figure 13:
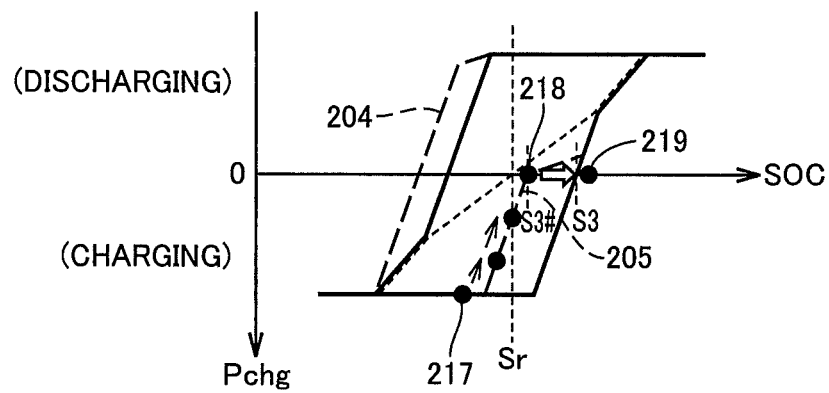
FIG. 13 is a schematic diagram to describe SOC transition in a high load running state from a high speed and low SOC state at the hybrid vehicle according to the second embodiment of the present invention.

FIG. 13 represents an example of SOC transition in a high load running state from a high speed and low SOC state at the hybrid vehicle according to the second embodiment of the present invention.

Referring to FIG. 13, charging/discharging electric power Pchg is set according to charging upper limit value Pcmax since requirement power Pr* is small in a low load running state. Therefore, when low load running is initiated in the vicinity of low limit SOC (Smin) at a high speed state (state 217), the setting of charging/discharging electric power Pchg such that main battery 310 is charged in accordance with charging upper limit map 205 (FIG. 11) causes the SOC to gradually increase.

When the SOC reaches S3# (second SOC) (state 218), the charging of main battery 310 is stopped since Pcmax=0 is set.

Therefore, even if a low load running state is further continued, the SOC will not become higher than S3# since charging/discharging electric power Pchg is set at the discharging side (Pchg<0). In other words, charging upper limit map 203 is configured to allow charging of main battery 310 with SOC=S3# as the limit (S3#<S3). Accordingly, when at a high speed state, charging is suppressed to a lower SOC, as compared to a non-high speed state.

When in deceleration following acceleration, the SOC does not increase so much even if main battery 310 is charged by regenerative power (state 219). Since the energy collected by regenerative braking is great at a high speed state, the suppression of charging down to a region lower than that of a non-high speed state allows the SOC of main battery 310 to be prevented from increasing too much after acceleration.

As described above, in addition to the advantage of the first embodiment, the hybrid vehicle of the second embodiment can control the charging and discharging of main battery 310 more appropriately taking into account the increase of the regenerative energy during deceleration at a high speed state.

Third Embodiment

The third embodiment is directed to controlling modification of charging/discharging electric power range Pcmax to −Pdmax according to the temperature of main battery 310.

Figure 14:
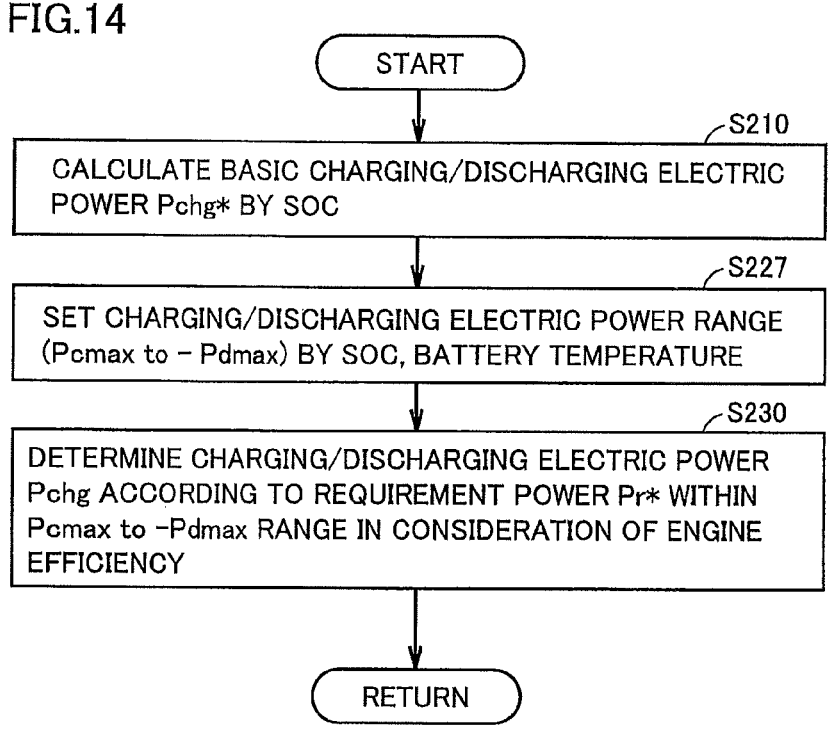
FIG. 14 is a flowchart to describe in detail a control process to set charging/discharging electric power at a hybrid vehicle according to a third embodiment of the present invention.

FIG. 14 represents a control process to set charging/discharging electric power Pchg at a hybrid vehicle according to a third embodiment, executed instead of the process in FIG. 4.

Referring to FIG. 14, following the process of step S210 that is the same in FIG. 4, ECU 400 sets by step S227 a charging upper limit value Pcmax and discharging upper limit value Pdmax reflecting the temperature of main battery 310 (battery temperature). Further, ECU 400 determines charging/discharging electric power Pchg according to requirement power Pr* so as to improve the heat efficiency of engine 100 within the range of Pcmax to −Pdmax set at step S227, by step S230 that is the same in FIG. 4. The third embodiment differs from the first embodiment in the setting of charging and discharging upper limit values Pcmax and Pdmax.

The setting of charging/discharging upper limit values Pcmax and Pdmax at step S227 will be described with reference to the schematic diagram of FIG. 15.

Figure 15:
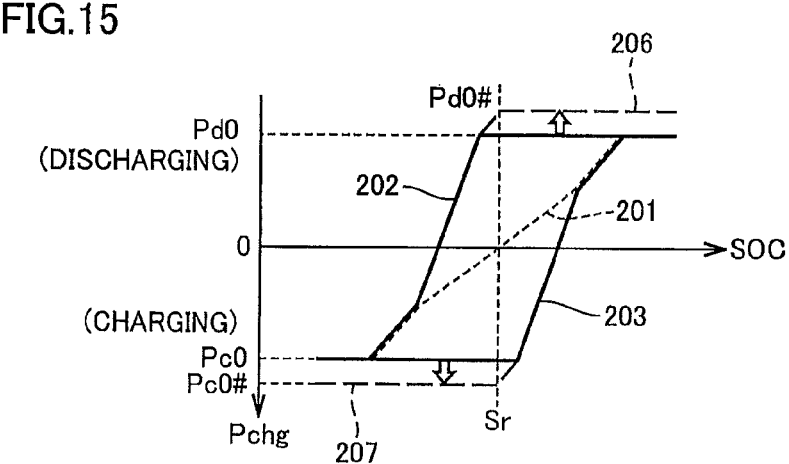
FIG. 15 is a schematic diagram to describe a setting range of charging/discharging electric power at the hybrid vehicle according to the third embodiment.

Based on the comparison between FIGS. 15 and 5, the third embodiment has the basic charging/discharging electric power Pchg* set according to map 201 that is the same in FIG. 4. The third embodiment differs from the first and second embodiments in that the maximum charging value and maximum discharging value in discharging upper limit map 202 and charging upper limit map 203 vary according to the battery temperature.

When main battery 310 is not at a low temperature, for example, when the battery temperature is higher than a predetermined threshold value, discharging upper limit map 202 is set so that the maximum discharging value becomes Pd0, likewise with that in FIG. 5. Similarly, charging upper limit map 203 is set such that the maximum charging value becomes Pc0, likewise with that in FIG. 5.

In contrast, when main battery 310 is at a low temperature, for example, when the battery temperature is lower than a predetermined threshold value, a discharging upper limit map 206 and a charging upper limit map 207 are applied. By discharging upper limit map 206, the maximum discharging value is raised to Pd0# (Pd0#>Pd0) over the entire SOC region. Similarly, by charging upper limit map 207, the maximum charging value is raised to Pc0# (Pc0#>Pc0).

Since the charging/discharging electric power Pchg setting range (Pcmax to −Pdmax) is increased when the temperature of main battery 310 is low, main battery 310 can be charged/discharged at a greater electric power. As a result, the increase in the amount of generated heat at main battery 310 allows the temperature of main battery 310 to be raised efficiently. When the temperature of main battery 310 increases to come out of the low temperature state, the normal maximum charging value Pc0 and maximum discharging value Pd0 are set. Accordingly, overdischarging or overcharging of main battery 310 can be suppressed.

With regard to the charging upper limit map and discharging upper limit map in the second embodiment (FIG. 11), charging and discharging upper limit values Pcmax, Pdmax can be set such that the maximum charging value and maximum discharging value are increased when main battery 310 is at a low temperature state.

Moreover, charging/discharging upper limit values Pcmax and Pdmax can be set to temporarily apply discharging upper limit map 206 and/or charging upper limit map 207 when running in a high load running state with high SOC. Accordingly, such temporarily increase in the amount of discharging or charging allows the engine efficiency during charging/discharging to be further increased, so that the vehicle energy efficiency can be improved.

Fourth Embodiment

Charging/discharging control according to the carrying load of the hybrid vehicle in the fourth embodiment will be described hereinafter. The charging/discharging control according to the fourth embodiment set forth below can be combined appropriately with the charging/discharging control described in the first to third embodiments.

Figure 16:
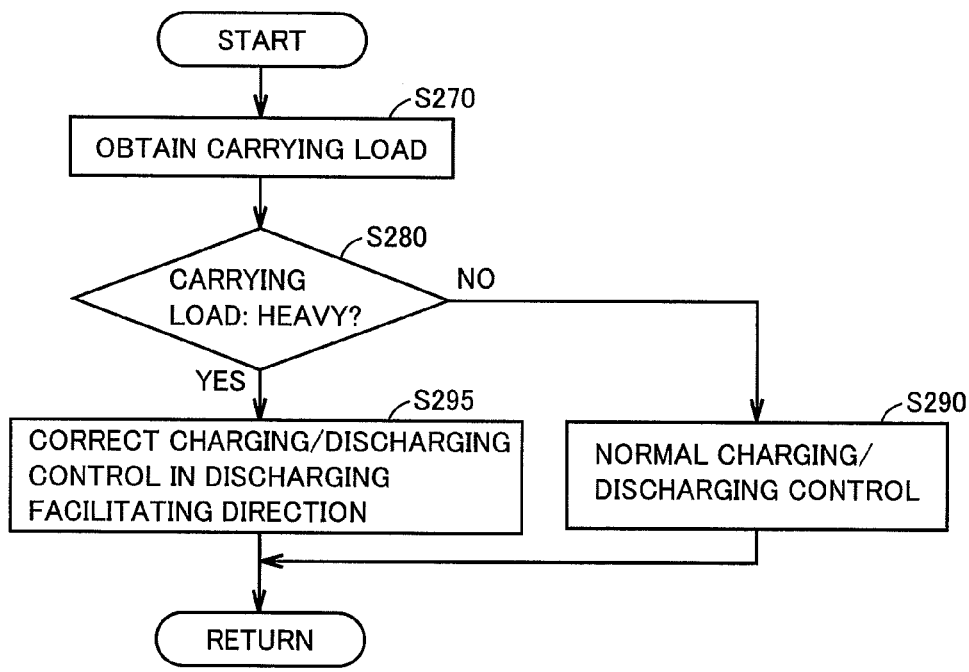
FIG. 16 is a flowchart to describe a control process of charging/discharging control at a hybrid vehicle according to a fourth embodiment of the present invention.

FIG. 16 is a flowchart to describe a control process of charging/discharging control at a hybrid vehicle according to the fourth embodiment.

Referring to FIG. 16, ECU 400 estimates the carrying load of hybrid vehicle 10 by step S270.

For example, the carrying load can be estimated based on the number of passengers and/or the output from a sensor that can identify the size of the passenger. Alternatively, the passenger weight can be estimated based on the load exerted to a sheet detected such as by a strain gauge type weight sensor on a sheet frame or a pressure sensor map incorporated on a cushion pad. The passenger weight can also be estimated based on the pressure applied to a mat located under a cushion pad and in which gel is sealed.

Alternatively, the passenger weight can be estimated based on an output from a system that detects the body posture of a passenger by an image sensor. Further, the carrying load of hybrid vehicle 10 can be estimated using an output from an acceleration sensor, a yaw rate sensor, a suspension position sensor, or a sensor directed to detecting the carrying load in a luggage room. Estimation of the carrying load by step S270 can be executed arbitrarily by appropriately arranging a sensor or the like.

ECU 400 compares the carrying load estimated at step S270 with a predetermined determination value by step S280. When the carrying load is smaller than a predetermined value (NO determination at step S280), ECU 400 causes control to proceed to step S290 to execute normal charging/discharging control.

In contrast, when the carrying load is greater than the predetermined value (YES determination at S280), ECU 400 causes control to proceed to step S295 to set charging/discharging electric power Pchg such that discharging of main battery 310 is relatively facilitated as compared to the normal charging/discharging control (step S290). Accordingly, when the carrying load is great, charging/discharging control is executed such that discharging of main battery 310 is facilitated, as compared to the case where the carrying load is low. Paragraph at page 29, line 20 through line 23:

The technique of correcting the setting of charging/discharging electric power Pchg based on an example of charging/discharging control to facilitate discharging of main battery 310 will be described with reference to FIGS. 17 and 18.

Figure 17:
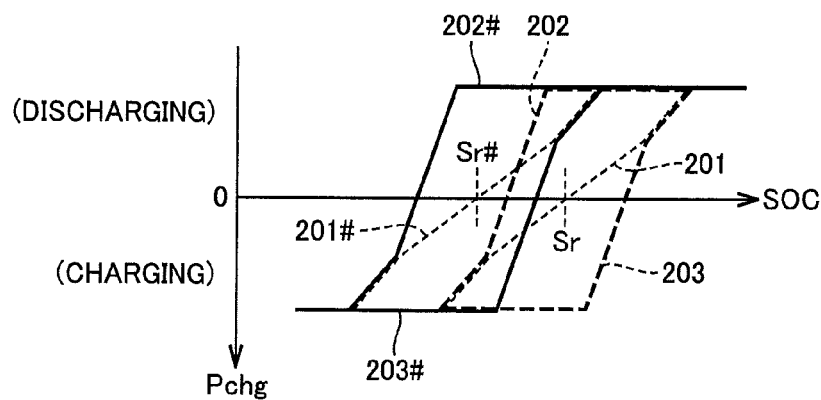
FIG. 17 is a schematic diagram to describe a setting range of charging/discharging electric power at the hybrid vehicle according to the fourth embodiment.

FIG. 17 is schematic diagram to describe the setting range of charging/discharging electric power at a hybrid vehicle according to the fourth embodiment.

Referring to FIG. 17, charging/discharging is controlled with Sr as the control center in the normal charging/discharging control by step S290. Charging/discharging electric power Pchg is set according to requirement power Pr* within the range of Pcmax to −Pdmax set according to characteristic line 201, discharging upper limit map 202, and charging upper limit map 203 in the first embodiment (FIG. 5).

In contrast, charging/discharging is controlled with the control center as Sr# (S#<Sr) in the charging/discharging control by step S295. For example, charging/discharging electric power Pchg is set according to requirement power Pr* within the range of Pcmax to −Pdmax set according to a characteristic line 201#, a discharging upper limit map 202# and a charging upper limit map 203# corresponding to characteristic line 201, discharging upper limit map 202 and charging upper limit map 203 shifted to the lower SOC side.

As a result, charging/discharging of main battery 310 is controlled such that, when the carrying load is heavy, the control center of the SOC is shifted to the lower SOC side, than when the carrying load is light. Accordingly, discharging of main battery 310 is facilitated.

When the carrying load is heavy, the regenerative energy collected during deceleration increases. Therefore, by regulating the SOC at a lower level to facilitate discharging of main battery 310 in consideration of collection of the regenerative energy, continuation of a high SOC state at the time of regenerative power generation can be suppressed.

Figure 18:
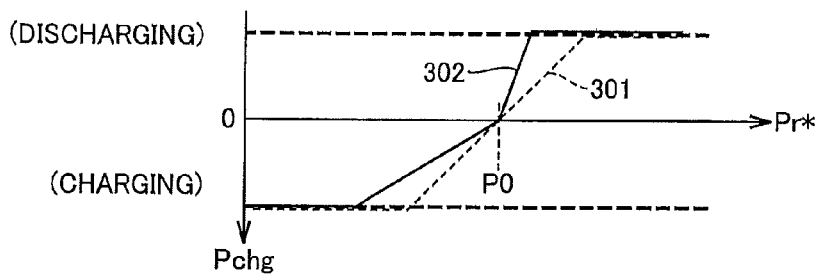
FIG. 18 is a schematic diagram to describe setting of charging/discharging electric power according to requirement power at the hybrid vehicle of the fourth embodiment.

FIG. 18 is a schematic diagram to describe a setting of charging/discharging electric power according to requirement power at the hybrid vehicle according to the fourth embodiment. FIG. 18 represents a map to set charging/discharging electric power Pchg according to requirement power Pr* within the range of Pcmax to −Pdmax, likewise with that in FIG. 7.

Referring to FIG. 18, a map 301 indicated by a dotted line is similar to the map shown in FIG. 7. According to the normal charging/discharging control by step S290, charging/discharging electric power Pchg is set according to map 301.

In contrast, the charging/discharging control by step S295 has a map 302 applied instead of map 301. Map 302 is set such that the discharging electric power is increased or the charging electric power is decreased with respect to the same requirement power Pr*, as compared to that of map 301. In other words, by setting charging/discharging electric power Pchg through map 302, charging/discharging electric power Pchg can be set at the discharging side as compared to the case where map 301 is applied. As a result, when the carrying load is heavy, the SOC can be regulated at a lower level so as to facilitate discharging of main battery 310, likewise with the setting in FIG. 17.

Thus, the setting of charging/discharging electric power Pchg using the map in FIG. 17 and/or FIG. 18 allows the SOC to be regulated at a lower level so as to facilitate discharging of main battery 310 in consideration of the collection of the regenerative energy when the carrying load is heavy.

Alternatively, the discharging of main battery 310 in a heavy load state can be facilitated by modifying the transition condition of the running mode in the case where a running mode with the engine stopped (EV mode) and a running mode with the engine operating (HV mode) can be selectively executed such as hybrid vehicle 10 shown in FIG. 11.

Figure 19:
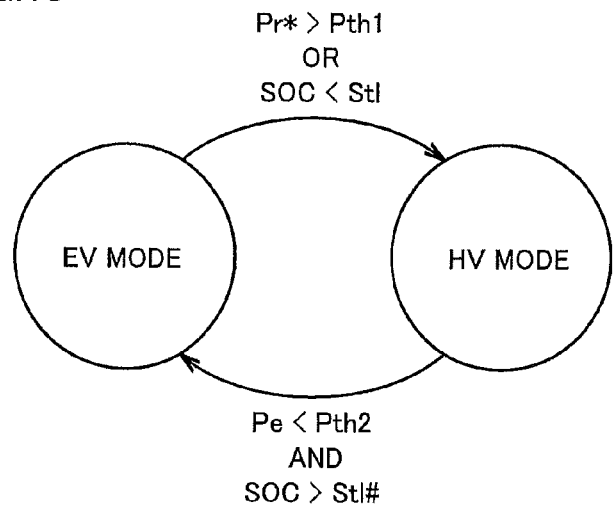
FIG. 19 represents the transition of the running mode at a hybrid vehicle.

FIG. 19 represents the transition of the running mode at hybrid vehicle 10.

Referring to FIG. 19, hybrid vehicle 10 runs by the output from motor generator 300B in an EV mode. In an EV mode, requirement power Pr* for the vehicle to run must be within a range that does not require output from engine 100. In an EV mode, the SOC gradually decreases since charging of main battery 310 by an engine output is not executed.

Therefore, the EV mode is selected on the condition that the SOC is higher than a predetermined lower limit value St1 and requirement power Pr* is lower than a power threshold value Pth1. Therefore, when Pr*>Pth1 or SOC>St1 is established in an EV mode, the running mode exhibits transition to an HV mode.

When an HV mode is applied due to an increase of requirement power Pr* or reduction in SOC, engine 100 is started. Upon the startup of engine 100, charging/discharging of main battery 310 is controlled according to the power generation caused by the output from engine 100 according to the first to third embodiments, or the process in FIG. 17 and/or FIG. 18 of the fourth embodiment. Moreover, requirement power Pr* is ensured by the output from engine 100.

When engine requirement power Pe is decreased in an HV mode, engine 100 can be rendered inactive. Therefore, when engine requirement power Pe is lower than a power threshold value Pth2 in an HV mode, transition to an EV mode is specified. At this stage, the SOC to continue an EV mode for some period of time is required. Therefore, when Pe<Pth2 and SOC<St1# (St1#>St1) are established in an HV mode, the running mode exhibits transition to an EV mode.

Figure 20:
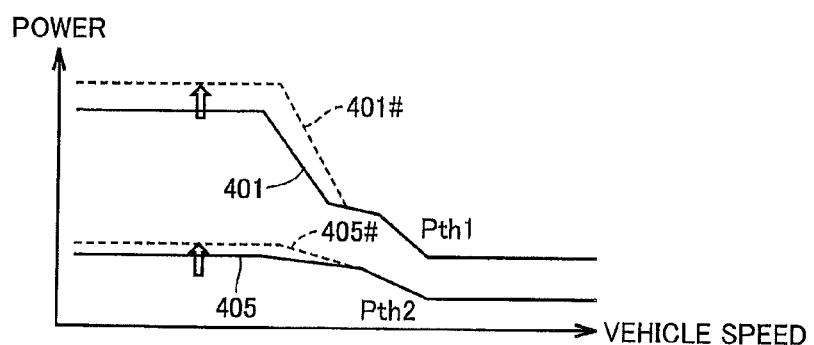
FIG. 20 is a schematic diagram to describe setting of a power threshold value used for determining transition of a running mode.

FIG. 20 is a schematic diagram to describe the setting of power threshold values Pth1 and Pth2 to determine transition of the running mode.

Referring to FIG. 20, threshold values Pth1 and Pth2 are set according to the vehicle speed. Schematically, power threshold values Pth1 and Pth2 are set higher as a function of a lower vehicle speed.

Threshold values Pth1 and Pth2 are set according to maps 401 and 405, respectively, when the carrying load is light (step S290). In contrast, when the carrying load is heavy (step S295), power threshold values Pth1 and Pth2 are set according to maps 401# and 405#, respectively, indicated by a dotted line.

It is appreciated from FIG. 20 that power threshold values Pth1 and Pth2 are set higher in maps 401# and 405#, as compared to maps 401 and 405. Transition from an EV mode to an HV mode becomes harder as a higher power threshold value Pth1 is set. Similarly, transition from an HV mode to an EV mode becomes easier as a higher power threshold value Pth2 is set.

Therefore, the application of maps 401# and 405#, causes the operating time of engine 100 to become shorter, as compared to the case where maps 401 and 402 are applied. As a result, the SOC can be regulated at a lower level so as to facilitate discharging of main battery 310 when the carrying load is heavy.

According to the charging/discharging control by the fourth embodiment, the SOC can be regulated at a lower level to facilitate discharging of main battery 310 in consideration of the collection of relatively greater regenerative energy when the carrying load is heavy. As a result, continuation of a high SOC state during regenerative power generation when the vehicle carrying load is heavy can be suppressed.

It is to be noted that the powertrain configuration of the hybrid vehicle in the first to fourth embodiments is not limited to the example shown in FIG. 1. FIG. 1 represents an exemplified configuration in which a motor generator 300A (power generation mechanism) generating the charging electric power for main battery 310 by an output from engine 100, and a motor generator 300B (traction motor) generating the vehicle driving power are provided as separate motor generators. However, the application of the present invention is not limited to such a configuration of a hybrid vehicle.

For example, the charging/discharging control of a power storage device during engine operation can be executed, equivalent to the first to fourth embodiments, even for a hybrid vehicle having a configuration in which the power generation of the charging electric power for main battery 310 from an engine output and generation of vehicle driving power to assist the engine output are executed by a single motor generator at different times, as disclosed in PTD 3. In other words, "power generation mechanism" and "traction motor" may be configured by separate motor generators, or by a single motor generator that exhibits both functions in a time divisional manner.

Although FIG. 1 is based on an example of a hybrid vehicle that can select an EV mode and an HV mode, the present invention can also be applied to a hybrid vehicle absent of an EV mode for running with the engine stopped, except for the charging/discharging control described based on FIGS. 19 and 20 of the fourth embodiment.

It should be understood that the embodiments disclosed herein are illustrative and nonrestrictive in every respect. The scope of the present invention is defined by the terms of the claims, rather than the description set forth above, and is intended to include any modifications within the scope and meaning equivalent to the terms of the claims.

INDUSTRIAL APPLICABILITY

The present invention can be applied to a hybrid vehicle capable of generating charging electric power for a power storage device according to an output from the engine.

REFERENCE SIGNS LIST

10 hybrid vehicle; 12 driving wheel; 14 speed reducer; 16 driving shaft; 100 engine; 110 operation line (engine); 111, 112, 113 engine operating point; 120 equal power line; 201 basic map (charging/discharging electric power); 202 discharging upper limit map; 203 charging upper limit map; 211-219 state; 250 power split mechanism; 252 output shaft; 300, 300A, 300B motor generator; 310 main battery; 320 boost converter; 330 inverter; 340 monitor unit; 400 ECU; 402 MG_ECU; 404 HV_ECU; 406 engine ECU; Ib battery current; Ne engine revolution speed; Ne* engine target revolution speed; Pc0, Pc0# maximum charging value; Pchg charging/discharging electric power; Pchg* basic charging/discharging electric power; Pcmax charging upper limit value; Pd0, Pd0# maximum discharging value; Pdmax discharging upper limit value; Pcmax charging upper limit value; Pe engine requirement power; Pr* requirement power (vehicle running); Pth1, Pth2 power threshold value; Sr, Sr# SOC control target; Tb battery temperature; Te engine torque; Te* engine target torque; Vb battery voltage.

The invention claimed is:

1. A hybrid vehicle comprising:
   a power storage device,
   an engine,
   a power generation mechanism for generating charging electric power of said power storage device by an output from said engine, and
   a control unit configured to set charging/discharging electric power of said power storage device to control SOC of said power storage device to be within a range from a lower limit SOC to an upper limit SOC including a SOC control target in a running mode with said engine operating,
   said control unit setting said charging/discharging electric power, according to current SOC and requirement power required for vehicle running, within a range from a discharging upper limit value to a charging upper limit value,
   said discharging upper limit value being preset for each SOC to allow discharging of said power storage device to an extent corresponding to a first SOC higher than said lower limit SOC according to said requirement power, even when said SOC is lower than said SOC control target, and
   said charging upper limit value being preset for each SOC to allow charging of said power storage device to an extent corresponding to a second SOC lower than said upper limit SOC according to said requirement power, even when said SOC is higher than said SOC control target.

2. The hybrid vehicle according to claim 1, wherein said control unit sets said charging/discharging electric power according to said discharging upper limit value increased at a high speed state, when a vehicle speed is above a predetermined speed threshold value, as compared to at a low speed state, when the vehicle speed is below the predetermined speed threshold value, and when said power storage device is to be discharged since said SOC is lower than said SOC control target and said requirement power is great.

3. The hybrid vehicle according to claim 2, wherein said first SOC at said high speed state is set lower than said first SOC at said low speed state.

4. The hybrid vehicle according to claim 1, wherein said control unit-sets said charging/discharging electric power, based on a comparison between a predetermined power reference value corresponding to an operating point where heat efficiency of said engine is highest and said requirement power, such that discharging is facilitated when said requirement power is higher than said power reference value, and charging is facilitated when said requirement power is lower than said power reference value.

5. The hybrid vehicle according to claim 4, wherein said control unit sets said charging/discharging electric power according to said charging upper limit value decreased at a high speed state as compared to at a low speed state, when said power storage device is to be charged since said SOC is higher than said SOC control target and said requirement power is small.

6. The hybrid vehicle according to claim 5, wherein said second SOC—at said high speed state is set lower than said second SOC at said low speed state.

7. The hybrid vehicle according claim 1, wherein said control unit increases a setting range of said charging upper limit value and said discharging upper limit value when said power storage device is at a low temperature state, when a temperature of the device is below a predetermined threshold value, as compared to when said power storage device is at a high temperature state, when the temperature of the device is above the predetermined threshold value.

8. The hybrid vehicle according to claim 1, wherein said control unit-controls charging and discharging of said power storage device to facilitate discharging of said power storage device when a carrying load of said hybrid vehicle is heavy as compared to when said carrying load is light.

9. A control method of a hybrid vehicle incorporating a power storage device, an engine, and a power generation mechanism for generating charging electric power of said power storage device by an output from said engine, said control method comprising:
   the step of setting charging/discharging electric power of said power storage device to control SOC of said power storage device to be within a range from a lower limit SOC to an upper limit SOC including a SOC control target in a running mode with said engine operating,
   said setting step including
   the step of setting a discharging upper limit value and a charging upper limit value based on current SOC, and
   the step of determining said charging/discharging electric power according to the current SOC and requirement power required for vehicle running, within a range from said discharging upper limit value to said charging upper limit which are set in said setting step,
   said discharging upper limit value being preset for each SOC to allow discharging of said power storage device to an extent corresponding to a first SOC higher than said lower limit SOC according to said requirement power, even when said SOC is lower than said SOC control target, and
   said charging upper limit value being preset for each SOC to allow charging of said power storage device to an extent corresponding to a second SOC lower than said upper limit SOC according to said requirement power, even when said SOC is higher than said SOC control target.

10. The control method of a hybrid vehicle according to claim 9, wherein said discharging upper limit value is set such that discharging electric power becomes greater at a high speed state, when a vehicle speed is above a predetermined speed threshold value, than at a low speed state, when the vehicle speed is below the predetermined speed threshold value, in a region where said power storage device—is to be discharged since said SOC is lower than said SOC control target and said requirement power is great.

11. The control method of a hybrid vehicle according to claim 10, wherein said first SOC at said high speed state is set lower than said first SOC at said low speed state.

12. The control method of a hybrid vehicle according to claim 9, wherein, in said determining step, said charging/discharging electric power is determined, based on a comparison between a predetermined power reference value corresponding to an operating point where heat efficiency of said engine is highest and said requirement power, such that discharging is facilitated when said requirement power is higher than said power reference value, and charging is facilitated when said requirement power is lower than said power reference value.

13. The control method of a hybrid vehicle according to claim 12, wherein said charging upper limit value is set such that charging electric power becomes smaller at a high speed state than at a low speed state in a region where said power storage device is to be charged since said SOC is higher than said SOC control target and said requirement power is small.

14. The control method of a hybrid vehicle according to claim 9, wherein said setting step further includes the step of increasing a setting range of said charging upper limit value and said discharging upper limit value when said power storage device is at a low temperature state, when a temperature of the device is below a predetermined threshold value, as compared to when said power storage device is at a high temperature state, when the temperature of the device is above the predetermined threshold value.

15. The control method of a hybrid vehicle according claim 9, further comprising the step of controlling charging and discharging of said power storage device to facilitate discharging of said power storage device when a carrying load of said hybrid vehicle is heavy as compared to when said carrying load is light.

* * * * *